US012705162B2

(12) United States Patent
Fitzpatrick et al.

(10) Patent No.: US 12,705,162 B2
(45) Date of Patent: Aug. 11, 2026

(54) SELF-HEALING MULTIPATHING CODE WITH ARTIFICIAL INTELLIGENCE (AI) REINFORCEMENT FEEDBACK

(71) Applicant: INTERNATIONAL BUSINESS MACHINES CORPORATION, Armonk, NY (US)

(72) Inventors: Desmond Fitzpatrick, Ossining, NY (US); Andrew C. M. Hicks, Highland, NY (US); Michael Terrence Cohoon, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 18/522,508

(22) Filed: Nov. 29, 2023

(65) Prior Publication Data

US 2025/0173245 A1 May 29, 2025

(51) Int. Cl.
*G06F 11/3604* (2025.01)

(52) U.S. Cl.
CPC ................................ *G06F 11/3608* (2013.01)

(58) Field of Classification Search
CPC .................................................. G06F 11/3608
USPC .................................................. 717/120–178
See application file for complete search history.

(56) References Cited

U.S. PATENT DOCUMENTS 10,999,012 B2 * 5/2021 Ho .................... H03M 13/6547
12,164,890 B2 * 12/2024 Jones ...................... G06F 8/443
2008/0294942 A1 * 11/2008 Breitgand ........... G06F 11/3612 714/38.11
2012/0084759 A1 * 4/2012 Candea ............... G06F 11/3636 717/134
2013/0219222 A1 * 8/2013 Xue .................... G06F 11/3688 714/32
2020/0328858 A1 * 10/2020 Medard ................. H04L 5/0046
2022/0179731 A1 * 6/2022 Jung ................... G06F 11/0793
2024/0403438 A1 * 12/2024 Chan .................. G06F 11/0793

OTHER PUBLICATIONS

Sharma, Shree Krishna, and Xianbin Wang. "Toward massive machine type communications in ultra-dense cellular IoT networks: Current issues and machine learning-assisted solutions." IEEE Communications Surveys & Tutorials 22.1 (2019): pp. 426-471. (Year: 2019).*

Meyer, Thomas, Lidia Yamamoto, and Christian Tschudin. "A self-healing multipath routing protocol." Proceedings of the 3rd International Conference on Bio-Inspired Models of Network, Information and Computing Sytems. 2008. pp. 1-8 (Year: 2008).*

Freeman, Ronald H. "On the characterization of resilience vs robustness of autonomous robotic systems." ASCEND 2022. 2022. pp . 1-9. (Year: 2022).*

(Continued)

*Primary Examiner* — Satish Rampuria
(74) *Attorney, Agent, or Firm* — Onyx IP Group

(57) ABSTRACT

Self-healing multipathing code with AI reinforcement feedback, includes identifying, during execution an application including a portion of multipathing code comprising a first path and a second path, a first fault in an execution of the first path; generating, based on the first fault, a first prompt to an artificial intelligence (AI) language model; and applying a first modification to the first path based on an output of the AI language model in response to the first prompt.

16 Claims, 6 Drawing Sheets

(56) References Cited

OTHER PUBLICATIONS

Sharma, Shree Krishna, and Xianbin Wang. "Toward massive machine type communications in ultra-dense cellular loT networks: Current issues and machine learning-assisted solutions." IEEE Communications Surveys & Tutorials 22.1 (2019): pp. 426-471. ( Year: 2019).*

Zhang, Zhongshan, et al. "On swarm intelligence inspired self-organized networking: its bionic mechanisms, designing principles and optimization approaches." IEEE Communications Surveys & Tutorials 16.1 (2013): 513-537. (Year: 2013).*

Vishal Sharad, Hingmire, Santosh R. Desai, and Kanse Yuvraj Krishnrao. "Fault-tolerant multi-path data communication mechanism in WSN based on optimization enabled routing." Wireless personal communications 125.1 (2022): 841-859. (Year: 2022).*

Jangam, Sandeep Kumar. "Self-Healing Autonomous Software Code Development." International Journal of Emerging Trends in Computer Science and Information Technology 3.4 (2022): 42-52. (Year: 2022).*

* cited by examiner

SELF-HEALING MULTIPATHING CODE WITH ARTIFICIAL INTELLIGENCE (AI) REINFORCEMENT FEEDBACK

BACKGROUND

The present disclosure relates to methods, apparatus, and products for self-healing multipathing code with AI reinforcement feedback. Migrating the functionality of legacy source code to a more modern programming language can increase the maintainability and readability of the source code as well as improve system performance. However, such a migration is an arduous task that can include writing, testing, validating, and debugging massive amounts of code. If the modernized source code is deployed with errors into a complex software system, expected operations may fail to complete, exhaustive retry logic may hog resources, transactions can begin to fail, and entire components of the stack may fail, leading to a potential outage. This can be disastrous, especially in core production systems.

SUMMARY

According to embodiments of the present disclosure, various methods, apparatus and products for self-healing multipathing code with artificial intelligence (AI) reinforcement feedback are described herein. In some aspects, an AI language model is used to assist in remapping application source code from an original codebase to a target codebase while maintaining the same functionality. In some aspects, multipathing code is used to deploy a first code path using the new source code and a second code path using the original source code. If the first code path fails, the application can revert to a prior state and switch execution to the second code path that uses the application's original source code without interruption of the application. In some aspects, when a multipathing module observes that the second code path succeeded, the multipathing module uses this result as a reinforcement to prompt the AI language model to generate alternative source code that achieves the successful result of the second code path while avoiding the fault detected in the first code path. In this way, the multipathing module facilitates self-healing code that reduces the reliance on humans to test, debug, correct, and redeploy source code when migrating from an original codebase to a new codebase, such as from a first programming language to a second programming language or from a legacy system to a modernized system.

In a particular embodiment, a method of self-healing multipathing code with AI reinforcement feedback includes identifying, during execution an application including a portion of multipathing code comprising a first path and a second path, a fault in an execution of the first path. The method also includes generating, based on the fault, a prompt to an AI language model. The method further includes applying a modification to the first path based on a response to the prompt from the AI language model. In this way, the system self-heals the fault in the first path using AI-generated code.

In some variations, the second path is executed in response to identifying the first fault in the first path and generating the first prompt is further based on determining that the second path executed successfully. This provides reinforcement to the system that the error arises from the remapping of the original codebase to the new codebase and not from a logic error within the original codebase.

In some variations, generating, based on the first fault, a first prompt to an AI language model includes determining whether the first fault resulted from AI-generated code or human-generated code and generating the first prompt based on whether the first fault resulted from AI-generated code or human-generated code. In this way, the system can tailor the prompt to receive the output that is most appropriate based on whether the code is to be generated (in the case of a human generated code) or regenerated (in the case of AI-generated code). When the code is AI-generated code to be regenerated, it may be advantageous to also include failure point information from the code.

In some variations, the method further comprises identifying a second fault during execution of the first path after application of the first modification, where the second fault resulted from a same portion of code as the first fault. In these variations, the method also includes generating a second prompt to the AI language model based on failure information of the first fault and the second fault. In these variations, the method also includes applying a second modification to the first path based on the output of the AI language model in response to the second prompt. In this way, failure information from multiple iterations of the code-healing process can be accumulated and provided to the AI-language model as additional guidance regarding the points of failure to be avoided.

In some variations, the method further includes identifying a second fault during execution of the first path after application of the first modification. In these variations, the method also includes adjusting one or more parameters of the AI language model. In these variations, the method further includes generating a second prompt to the AI language model. In this way, when the AI language model is failing to produce a solution to the problem, the "creativity" of the AI language model can be increased to consider other alternative implementations.

In some variations, the method further includes, in response to determining that execution of the first path after application of the first modification progressed beyond a point of the first fault, associating the first prompt with a resolution of the first fault. In this way, the system can learn how to respond to the same problem when encountered in other contexts.

In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

DETAILED DESCRIPTION

Figure 1:
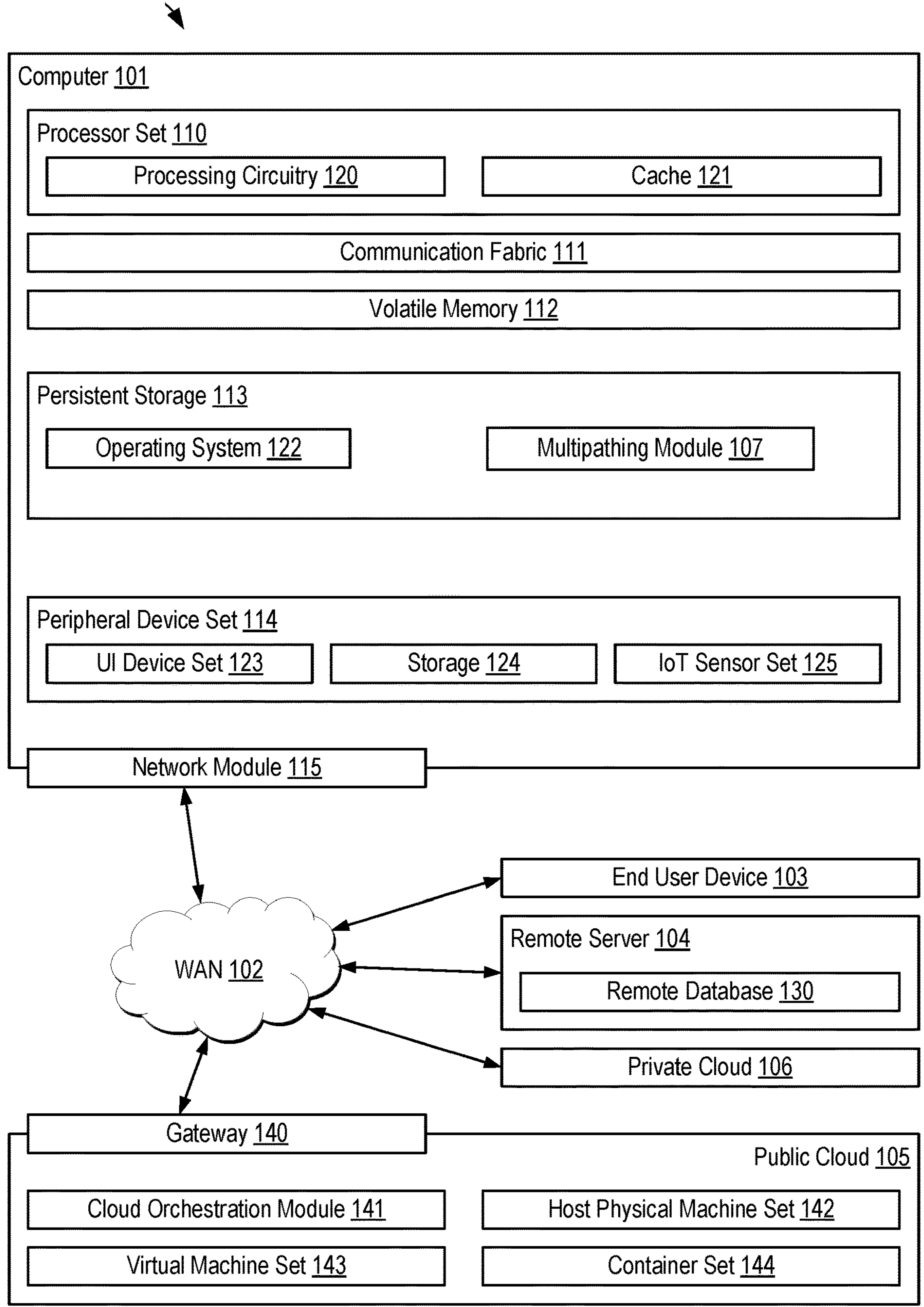
FIG. 1 sets forth a block diagram of an example computing environment for self-healing multipathing code with AI reinforcement feedback in accordance with some embodiments of the present disclosure.

When a code path fails in a complex software system, expected operations may fail to complete. Moreover, exhaustive retry logic may hog resources, transactions can begin to fail, and components of a stack may fail, leading to potential outage. Multipathing code may be used to mitigate concerns related to failures in code paths. Multipathing code describes the use of multiple, separate code paths configured to perform similar functionality. For example, different code paths may be configured or designed to generate the same outputs when applied to the same inputs or may be configured or designed to otherwise perform similar functionality. These different code paths designed to perform the same function may be implemented by different engineers or teams such that the resulting code paths are non-identical but designed to achieve the same outcome. These different code paths may also be written in different languages, access different libraries, or otherwise differ while being designed to achieve similar functionality. Each path of the multipathing code may be accessed using a shared interface, such as an Application Program Interface (API) or other interface as can be appreciated.

When a portion of multipathing code is encountered during the execution of an application or other software, state information may be saved that describes a state of execution at the point where the portion of multipathing code is encountered. The state information may describe the values for various registers, memory locations, counters, attributes, and the like. Should an error occur in a code path of the multipathing code, the saved state information may be used as a checkpoint for reverting or rewinding the state of execution of the application to a point prior to executing the code path of the multipathing code where the error occurred. A different code path of the multipathing code may then be executed. This process may be repeated until a code path of the multipathing code is executed without error.

Existing approaches for patching or updating code cause the code to be updated to be overwritten with the new code, effectively eliminating or deprecating the old code. Multipathing code may instead be used to maintain alternate code paths for the updated code and the code prior to updating. This may allow for execution of older versions of code should an update introduce a regression error. This may also allow for updated code paths that introduce debugging or logging code to only be executed should an error occur on another code path.

Multipathing code is particularly useful when porting or migrating original source code (e.g., legacy source code) of an application to a different programming language (e.g., a more modern source code). For example, the source code for an application may be migrated from a legacy programming language (e.g., COBOL) to a modern programming language (e.g., Java). The motivation for such a migration may be to facilitate easier maintenance and readability of the source code, increase security and error handling, improve software and/or hardware performance, and other advantages that will be recognized by those of skill in the art. To facilitate deployment of the new code and handling of regression errors, multipathing code can be used to maintain the original source code as an alternate code path for the new source code.

The advent of large language models and other improvements to artificial intelligence (AI) technology have enabled AI to generate source code. Large language models (LLMs), for example, are trained on massive datasets of source code to provide generative AI that outputs source code based on some input or prompt. As will discussed in further detail below, the migration of an application from its original source code to new source code can be assisted by such AI. That is, the AI can be used to generate new source code based on an input of original source code. For example, an LLM may be given a prompt such as "Generate Java code that achieves the same objectives as the following COBOL code," where the legacy COBOL source code is provided as an input. In response, the LLM may output, at least ideally, AI-generated Java source code that performs the same functions and produces the same output as the legacy. Of course, any new source code, whether human or AI generated, is susceptible to the introduction of bugs, execution errors, or other faults.

Embodiments in accordance with the present disclosure advantageously utilize multipathing code in conjunction with AI-generated code to provide self-healing multipathing code with AI reinforcement feedback that reduces human involvement in the migration of an application from an original codebase to a new codebase. As will be explained in more detail below, new source code that includes at least some portion of AI-generated code is deployed as one code path of multipathing code in tandem with a second code path that includes the original source code of the application. During execution of an application, when fault is detected in the code path that includes the new code, the application can be rolled back to a recovery point for execution of the second code path that includes the original code without any interruption to the application execution. Generative AI is utilized to provide an alternative to the code that caused the fault based on feedback from the second code path that indicates the original code successfully executed. The code path containing the alternative code can then be redeployed in the application. This process can iterate until the fault is resolved.

With reference now to FIG. 1, shown is an example computing environment according to aspects of the present disclosure. Computing environment 100 contains an example of an environment for the execution of at least some of the computer code involved in performing the various methods described herein, such as the multipathing module 107. In addition to the multipathing module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multipathing module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in multipathing module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in multipathing module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
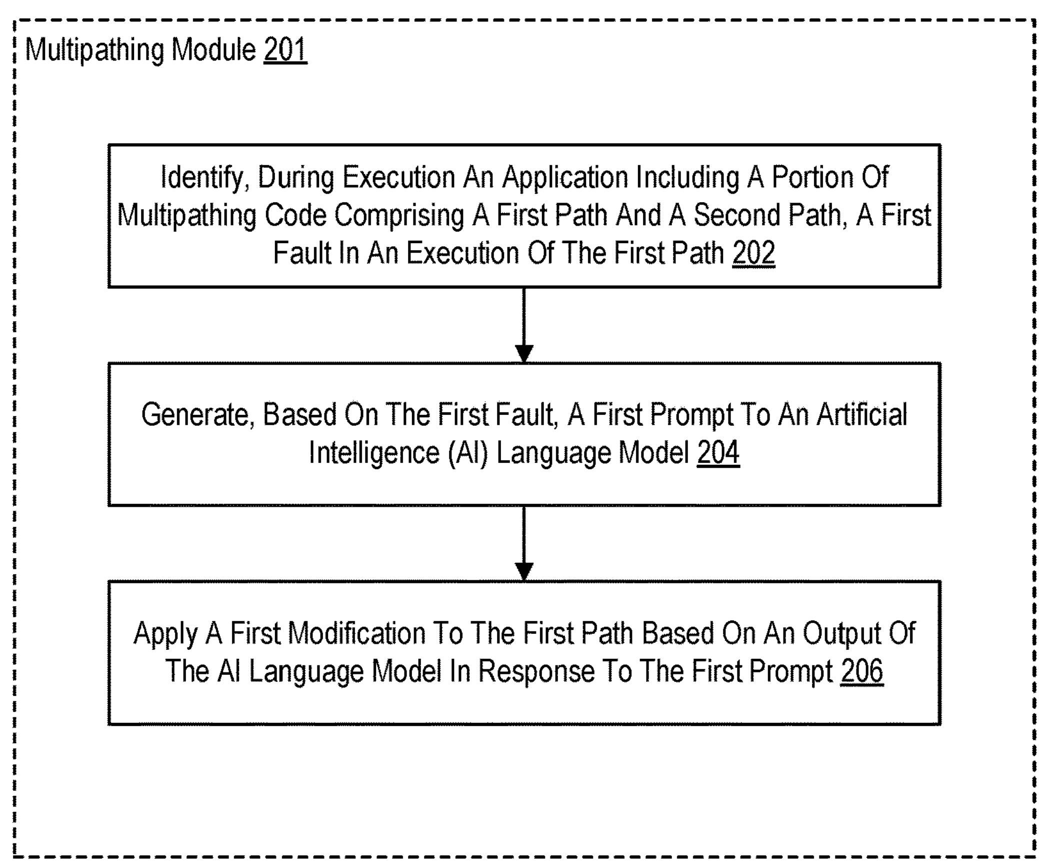
FIG. 2 sets forth a flowchart of an example method for self-healing multipathing code with AI reinforcement feedback in accordance with some embodiments of the present disclosure.

For further explanation, FIG. 2 sets forth a flowchart of an example method of self-healing multipathing code with AI reinforcement feedback in accordance with some embodiments of the present disclosure. The method of FIG. 2 may be performed, for example, by a multipathing module 201 such as the multipathing module 107 of FIG. 1. In some embodiments, the multipathing module 201 may be implemented as a process or service separate from an application or software implementing multipathing code. For example, the multipathing module 201 may be implemented by an operating system or other software that monitors the behavior and execution of an application implementing multipathing code. As another example, in some embodiments, the multipathing module 201 may be implemented as a process or service that applies modifications to applications implementing multipathing code in response to faults detected in the multipathing code.

The method of FIG. 2 includes identifying 202, during execution an application including a portion of multipathing code comprising a first path and a second path, a first fault in an execution of the first path. Although FIG. 2 describes execution of an application, it is understood that the approaches set forth herein may be applied to any software or module capable of implementing multipathing code, including applications, operating systems, libraries, and the like. In some examples, the first path is a default execution path in that, among multiple paths, execution of the first path is to be attempted first. If an error occurs during execution of the default execution path, the alternative or non-default code path may then be executed. In some examples, the first path and the second path reflect a migration of a portion of code from a first programming language (e.g., a legacy codebase) to a second programming language (e.g., a modern codebase). For example, the second path may be based on legacy source code written in an older programming language (e.g., COBOL), whereas the first path may be based on source code written in a modern programming language (e.g., Java); however, both the first path and the second path are intended to achieve the same objectives, provide the same interfaces, and produce the same output.

An application implementing multipathing code may include code configured to generate state information describing a state of execution of the application prior to executing any of the code paths of the portion of multipathing code. The saved state information may include a variety of information, including values for various registers, memory locations, counters, attributes, or other information as can be appreciated. The multipathing code may be inserted into the application prior to the portion of multipathing code or as part of an interface or function call used to execute the portion of multipathing code. In some examples, an interface such as an API or API call is used to execute the code paths of multipathing code. In the event of a fault in one code path, such as an execution error or thrown exception, the state information provides a recovery point from which the second code path can be executed. Thus, in some examples, the second path based on original source code serves as a backup to the first path based on the new source code. If a fault is encountered in the first path, the second path is executed without any interruption of the application. This allows the new code to be deployed in a production environment without a risk of failing service level requirements due to the deployment of the new code.

In some examples, some or all of the first path representing the updated codebase is generated utilizing an AI language model. For example, some or all of the original source code can be provided as an input to the AI language model with a request (e.g., a prompt) to generate source code in a different programming language that achieves the same objectives as the original source code. In some implementations, a particular portion of the source code for the first path includes metadata indicating whether that portion was human-generated or AI-generated. The first path including the AI-generated source code is then provided in the multipathing code with the second path including the original code serving as a secondary execution path.

In some examples, the multipathing module identifies 202 the fault in the execution of the first path by monitoring the execution of the application and observing that the first path has entered a failure state due to an error in execution. As can be appreciated, the fault may include a variety of execution errors. For example, the error may include a thrown exception including a caught or uncaught exception. As another example, the error may include failure of some verification or validation check performed during execution of the default execution path. As another examples, the error may include abnormal ending of the execution of the first path. In some examples, identifying 202 the first fault in the execution of the first path includes determining a portion of the code that caused the fault, such as a line of code, block of code function, class, or other programming construct that was executing at the time of fault. For example, the multipathing module may identify that a particular function or line of code within the function caused a particular exception to be thrown. The portion of code resulting in the fault, i.e., the point of fault within the code, is saved as failure state information. In some implementations, the system identifies other failure state information such as break point information, values for various variables, counters, or attributes, and the like. In some examples, the multipathing module 201 implements debugging logic to identify the point of failure in the code of the first path.

In response to identifying the fault in the first path, in some implementations the multipathing module 201 initiates execution of the second path. For example, the multipathing module 201 may set the second path as the default execution path and restore execution to the recovery point prior to executing the multipathing code. In some examples, data encoding the state information is loaded and the stored values accessed. These stored values can then be saved into their various registers, memory locations, counters, and the like. This effectively restores or rewinds execution of the application to the state reflected by the stored state information (e.g., to the point before where any of the different code paths of the multipathing code are executed). As such, any of the paths of multipathing code to be executed from effectively the same state.

When the second path executes successfully, this indicates that the logic in the original code is correct and that some error has resulted from migrating or remapping the original codebase to the new codebase. The determination that the second path executed successfully provides feedback to the multipathing module 201 that can be used to generate a prompt to an AI language model.

The method of FIG. 2 also includes generating 204, based on the fault, a first prompt to an AI language model. The AI language model may be a large language model or some other language model suitable for generating source code. The AI language model in this case is one that is configured to receive some portion of source code in a first programming language and generate source code in a second programming language that achieves the same objectives. The AI language model is further configured to receive a portion of code in a particular programming language and generate alternative source code in the same programming language that achieves the same objectives. The original source code and context for the request are provided to the AI language model as a prompt. The context for the request may include natural language statements that direct or otherwise qualify the output expected from the AI language model.

Where the first path includes AI-generated code, the successful execution of the second path reinforces that there is some error in the AI remapping of the original code to the new code. In some examples, the multipathing module 201 generates 204 the first prompt to the AI language model based on the failure point that caused the fault. The prompt is further based on the observation that the original code of the second path executed successfully. For example, the AI language model may generate three Java functions from a portion of COBOL code that successfully executed. Failure point information for the fault may indicate that the fault was caused by Java function X. In such a case, the multipathing module 201 may generate a simple prompt to "Regenerate code for function X" or "Regenerate code for function X that is syntactically different from the previously generated code."

In other examples, the prompt may include additional context for the AI language model to generate an output. In such examples, the multipathing module 201 generates 204 the first prompt to the AI language model by including failure point information to request the AI language model to provide an alternative that avoids an operation that caused the failure. If the failure state information related to a fault indicates a particular line of code that caused the fault, the multipathing module 201 can include additional context in the prompt based on such information. For example, the multipathing module 201 may generate a prompt such as "Regenerate the code without performing the operation in line N." In this way, the multipathing module 201 can use failure point information and other context to guide the AI language model into generating new code that does not replicate the error in the original code. Additional context that can guide the response can include an indication as to whether the portion of code that caused the fault was generated by a human or the AI language model. In some implementations, the multipathing module 201 implements natural language processing to formulate the prompt.

The method of FIG. 2 also includes applying 206 a modification to the first path based on an output of the AI language model in response to the first prompt. In some examples, the multipathing module 201 applies 206 the modification to the first path by inserting the source code generated by the AI language model into the source code of the first path. For example, where the multipathing module 201 detects an error in a particular function of Java source code for the first path, and where the AI language model has provided alternative source code for the particular function, the multipathing module 201 replaces the source code for the particular function with the alternative source code. The source code for the first path can then be recompiled and relinked for deployment in the application. When the multipathing code is executed again it can be determined whether the modification resolved the fault that was originally identified.

If the same fault is encountered again the prompt can be adjusted and iterated until the fault is resolved. As this code-healing process iterates, the multipathing module 201 can generate a library of failure information that can be applied with each iteration. The multipathing module 201 can improve its prompt generation using feedback of the failure state information from previous iterations, thus articulating more sophisticated prompts as the process continues to guide the AI language model into generating an output that will execute without the fault. Eventually there may be enough failure information collected and provided to the AI language model that the AI language model will be able to generate an alternative code path around the failures. As new faults are encountered the same process can be repeated for those faults. In this way, the multipathing module 201 implements self-healing code that can iteratively remedy faults that are detected in a code path until arriving at a version of the code path that is free of bugs. Because these prompts are autonomously generated by the multipathing module 201, the need for human involvement in debugging the application is reduced.

Although the above examples are described in the context of two paths within the multipathing code, it will be appreciated that two or more paths can be employed. For example, the multipathing module may prompt the AI language model to generate multiple alternatives to the original code and the self-healing code process described above can be performed on any or all of the paths, either in parallel or asynchronously. Further, although the above examples are described using one AI language model, it will be appreciated that one or more AI language models can be used. For example, the multipathing module may prompt two or more different AI language models to generate code for different alternative code paths. The multipathing model may then select from among the multiple responses or the multipathing module may insert additional code paths in accordance with the multiple responses from the different AI language models.

Figure 3:
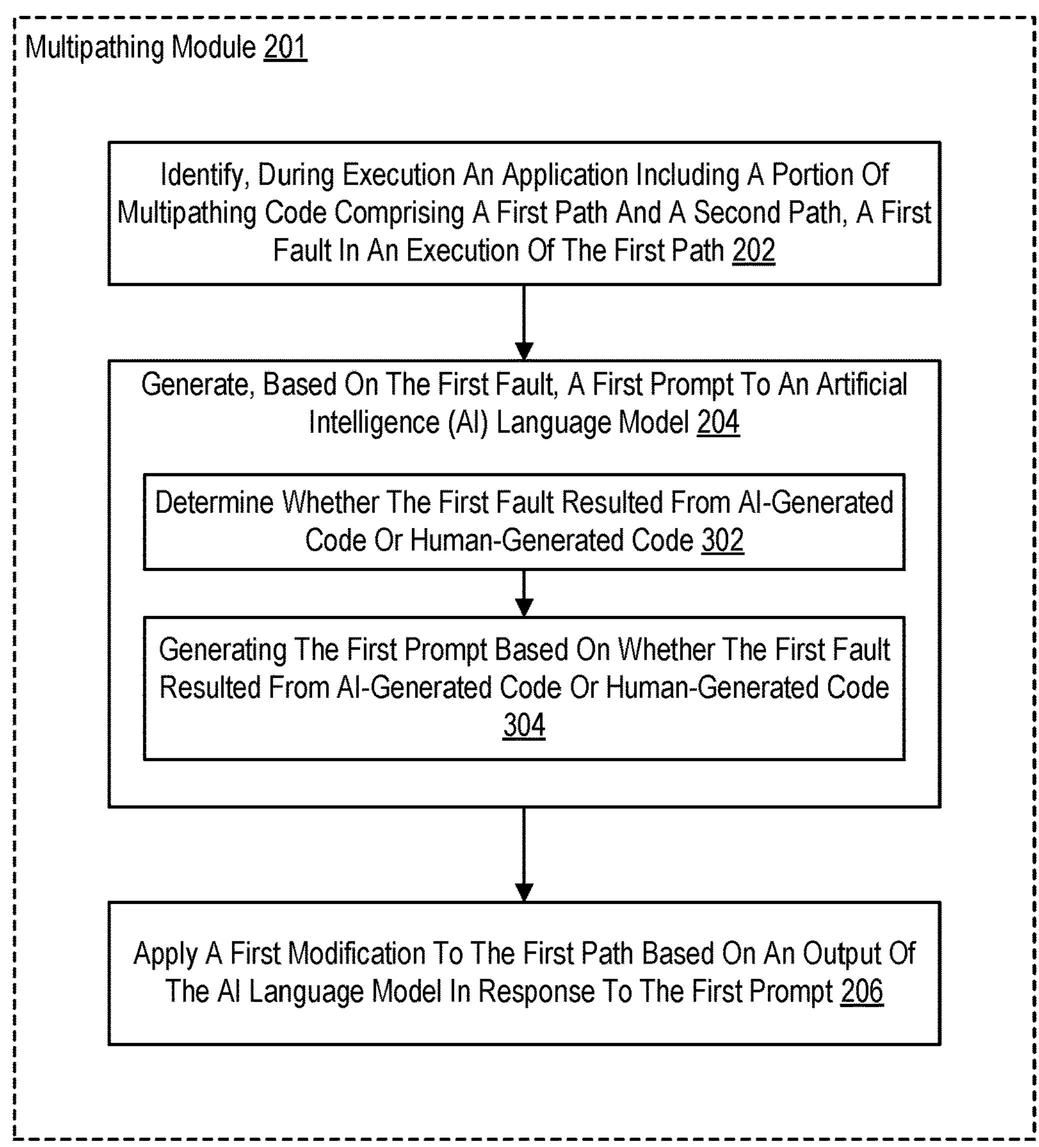
FIG. 3 sets forth a flowchart of another example method for self-healing multipathing code with AI reinforcement feedback in accordance with some embodiments of the present disclosure.

For further explanation, FIG. 3 sets forth a flowchart of an example method of self-healing multipathing code with AI reinforcement feedback in accordance with some embodiments of the present disclosure. The method of FIG. 3 extends the method of FIG. 2 in that generating 204, based on the first fault, a first prompt to an artificial intelligence (AI) language model further includes determining 302 whether the first fault resulted from AI-generated code or human-generated code. As mentioned above, source code can include metadata indicating whether the source code or a particular portion of source code was generated by the AI language model or by a human. Thus, in some examples, the multipathing module 201 identifies from this metadata whether the portion of code that resulted in the fault was generated by a human or AI.

In the method of FIG. 3, generating 204 the first prompt further includes generating 304 the first prompt based on whether the first fault resulted from AI-generated code or human-generated code. In some examples, the multipathing module 201 may generate the prompt to include a particular context based on whether the portion of code that resulted in the fault was generated by a human or AI. In some implementations, when the fault resulted from human-generated code, the prompt is generated to include a request to generate new code based on the human-generated code. In such a case, the AI language model did not generate the code that caused the error. Thus, it may be sufficient to prompt the AI language model to generate code that achieves the same objectives as the original code without any additional context or guidance because this is the first attempt by the AI language model to generate this code. In some implementations, when the fault resulted from AI-generated code, the prompt is generated to include a request to generate alternative code based on failure information associated with the AI-generated code. In order to guide the AI language model from generating the code that is too similar to the original code or that replicates the same errors, the multipathing module 201 may generate a prompt to include additional context indicating the AI language model should generate an alternative implementation of the original code or that the AI language model should generate code that does not include a particular point of failure identified in the failure information.

In other words, when the code that caused the error was human generated, it may be advantageous to avoid limiting the AI language model by prompting the AI language model to avoid a particular failure point. However, when the code that caused the error was AI-generated it may be advantageous to guide the AI language model to avoid replicating a previous error by including failure point information.

Figure 4:
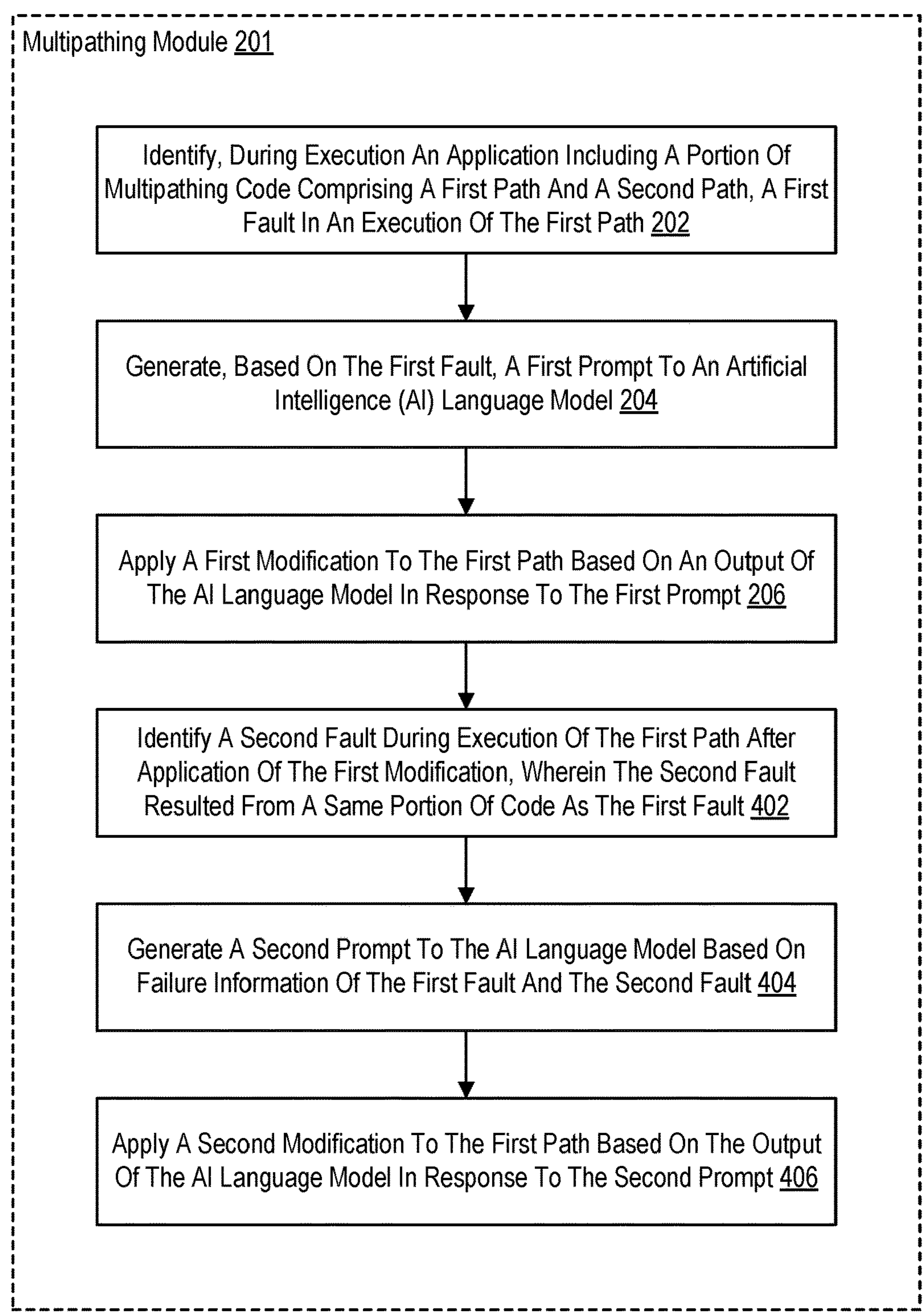
FIG. 4 sets forth a flowchart of another example method for self-healing multipathing code with AI reinforcement feedback in accordance with some embodiments of the present disclosure.

For further explanation, FIG. 4 sets forth a flowchart of an example method of self-healing multipathing code with AI reinforcement feedback in accordance with some embodiments of the present disclosure. The method of FIG. 4 extends the method of FIG. 2 in that the method of FIG. 4 further includes identifying 402 a second fault during execution of the first path after application of the modification, wherein the second fault resulted from a same portion of code as the first fault. After the source code received from the AI language model is inserted into the first path, the first path is executed again at some point. In some examples, the multipathing module 201 identifies 402 that the second fault in the first path, after application of the modification, corresponds to the same portion of code as the first fault by comparing the second fault to one or more previous faults detected during previous iterations of code healing. For example, the failure state information may indicate that the first fault resulted from a particular function or block of code. After inserting modified code into the AI-generated source code for that function and re-executing the first path, the multipathing module 201 may identify that the function or block of code is still resulting in a fault.

The method of FIG. 4 also includes generating 404 a second prompt to the AI language model based on failure information of the first fault and the second fault. In some examples, the multipathing module 201 generates 404 the second prompt much in the same manner as generating 204 the first prompt; however, in this instance the failure information provided in the second prompt includes failure information from the second fault (i.e., the current fault) and failure information from the first fault (i.e., some previous fault). For example, when a first fault results of operation N of block A and the second fault results from operation M of block A, the prompt may include "Regenerate block A without using operations M and N." In response, the AI language model may regenerate alternative code for the original code corresponding to block A while avoiding the operations M and N that it had previously generated.

The method of FIG. 4 also includes applying 406 a second modification to the first path based on the output of the AI language model in response to the second prompt. In some examples, the multipathing module 201 applies 406 the second modification in the same manner as it applied 206 the first modification.

Figure 5:
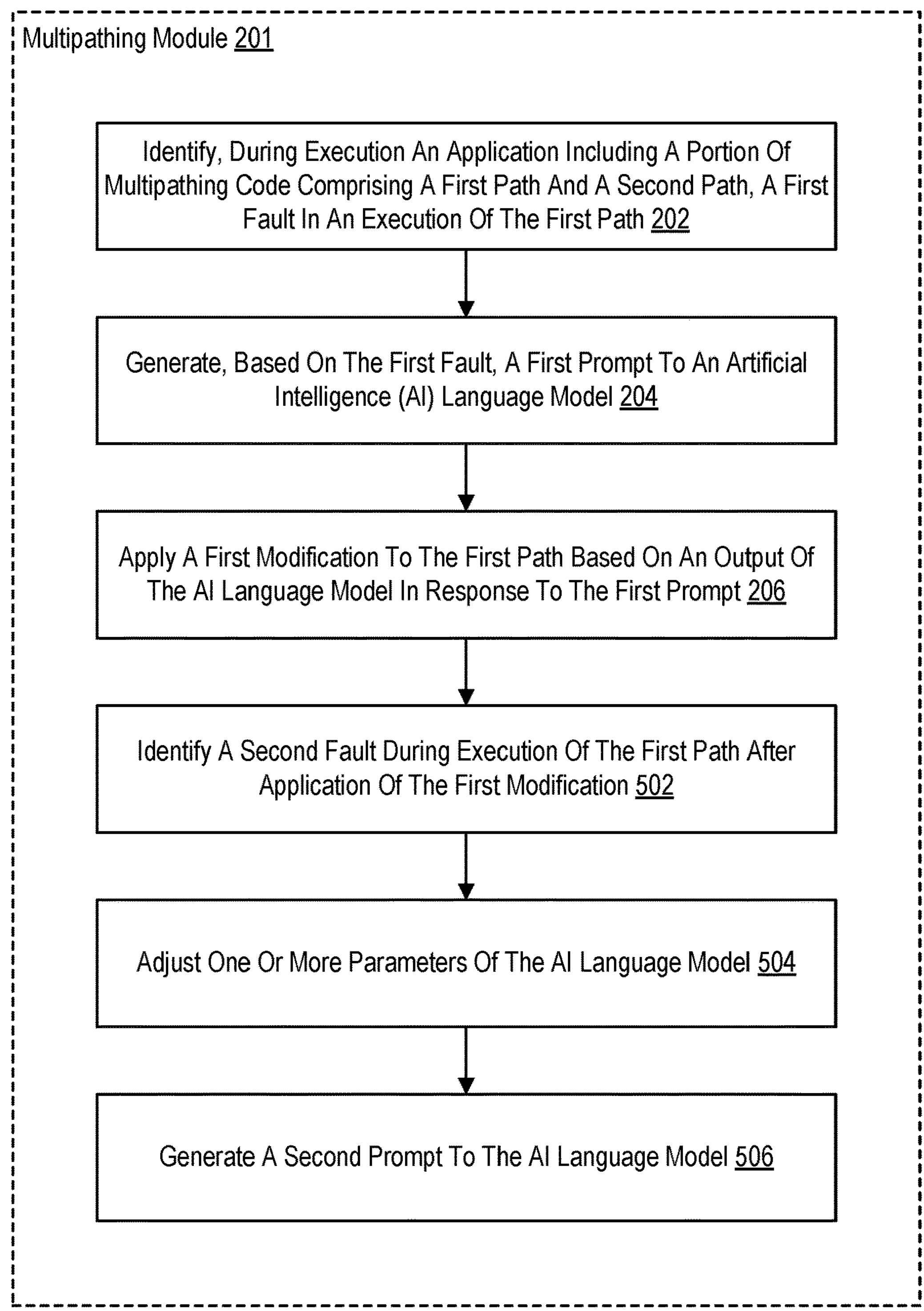
FIG. 5 sets forth a flowchart of another example method for self-healing multipathing code with AI reinforcement feedback in accordance with some embodiments of the present disclosure.

For further explanation, FIG. 5 sets forth a flowchart of an example method of self-healing multipathing code with AI reinforcement feedback in accordance with some embodiments of the present disclosure. The method of FIG. 5 extends the method of FIG. 2 in that the method of FIG. 5 further includes identifying 502 that execution of the first path after the modification resulted in a second fault. As discussed above, after the source code received from the AI language model is inserted into the first path, the first path is executed again at some point. In some examples, the multipathing module 201 identifies that execution the first path again resulted in fault in the same function or block code that produced the first fault. For example, the failure information may indicate that the first fault resulted from a particular function or block of code. After inserting modified code into the AI-generated source code for that function and re-executing the first path, the multipathing module 201 may identify that the function or block of code is still resulting in a fault.

The method of FIG. 5 also includes adjusting 504 one or more parameters of the AI language model. In some implementations, the AI language model includes configurable parameters that influence the creativity of the model's response to a prompt. For example, a temperature parameter adjusts the distribution of probabilities that can be used to select the next token for an output stream. In selecting the next token for an output stream, a lower temperature causes the language model to select tokens whose probabilities are within a narrower range, tending to more deterministic output, while a higher temperature causes the language model to select tokens whose probabilities are within a wider range, tending to more random output. Another example parameter is a top k parameter that controls the randomness of selecting the next token by telling the language model that it must select from the top k highest probability tokens. Yet another example parameter is a top p parameter that controls the randomness of selecting the next token by telling the language model that it must select from the highest probability tokens whose probabilities sum to or exceed the p value.

In some examples, the multipathing module 201 adjusts 504 one or more parameters of the AI language model in response to determining that a fault persists in the same block of code after more than one iteration. For example, as the number of iterations increases, the parameters that control the creativity of the AI language model may be adjusted to increase the randomness of the output. In this way, the AI language model can be induced to generate a solution that is dissimilar to the failed solutions presented in previous iterations. In some examples, adjusting 504 one or more parameters is carried out by including a statement in a prompt to adjust the parameter, such as "Set temperature to 0.8."

The method of FIG. 5 also includes generating 506 a second prompt to the AI language model. In some examples, after adjusting one or more parameters of the AI language model, the multipathing module 201 generates a second prompt to the AI language model requesting the AI language model to generate alternative code for the portion of code that resulted in the fault. This prompt may be a replica of the prompt used in a previous iteration of may be generated to include additional context as discussed above.

It will be appreciated that the parameters of the language model can be adjusted at any stage of the processing. For example, in some implementations, a preprocessing stage analyzes the original source code before the AI language model generates new source code from the original source code and sets the language model parameters based on the analysis. For example, a statistical analysis of the original code may be employed to predict how creative or deterministic the language model should be in its output.

Figure 6:
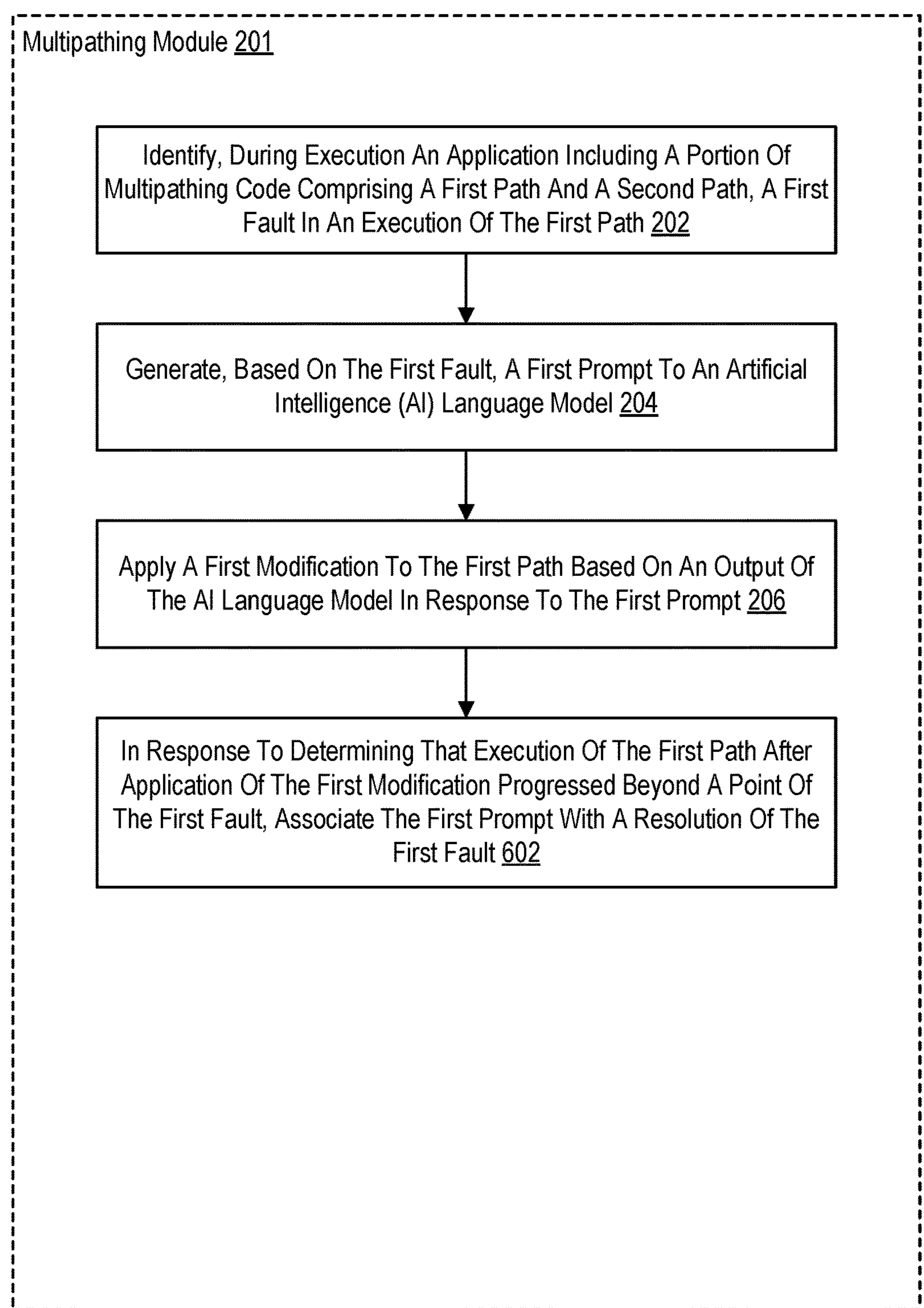
FIG. 6 sets forth a flowchart of another example method for self-healing multipathing code with AI reinforcement feedback in accordance with some embodiments of the present disclosure.

For further explanation, FIG. 6 sets forth a flowchart of an example method of self-healing multipathing code with AI reinforcement feedback in accordance with some embodiments of the present disclosure. The method of FIG. 6 extends the method of FIG. 2 in that the method of FIG. 6 further includes in response to determining that execution of the first path after application of the first modification progressed beyond a point of the first fault, associating 602 the first prompt with a resolution of the first fault. In some examples, the multipathing module 201 determines that execution of the first path including the modification progressed beyond a point of the first fault by determining that the first path successfully executed without any fault or by detecting a new fault that is farther down the execution path than the first fault. In some examples, associating 602 the first prompt with a resolution of the fault can include storing an association between the line of code, code block, or function that caused the fault and the prompt text and/or the settings of the language model configuration parameters that were used to produce AI-generated code that fixed the problem. As the multipathing module 201 encounters similar faults and successfully resolves them, this association can be reinforced. In this way, the multipathing module 201 can be trained to generate prompts and to program language model configuration settings that are optimal for encounters of the same fault in other applications.

The above-described examples are provided in the context of migrating or remapping an application from original source code to new source code using self-healing multipathing code. It will be appreciated that the term 'original source code' as used herein refers to the instance of the application against which the new source code is being validated for functionality, and should not be construed as limiting the term to mean the earliest implementation of that application. While embodiments are useful in migrating or porting an application from one programming language to a different programming language, and from legacy code to a more modernized programming language, it will be further appreciated that in some examples the original source code and the new source code may be written in the same programming language.

In view of the foregoing, self-healing multipathing code with AI reinforcement feedback in accordance with the present disclosure provides a number of advantages. When a path of code encounters a problem during execution, a multipathing module discovers where and how the problem occurred. With this information, an AI language model is used to generate a block of code to accomplish the desired task though a different implementation in order to avoid the original problem. When a problem is found during execution of a code path that was generated with AI, the multipathing module uses reinforcement learning to improve the output received from the AI language model.

With these techniques, embodiments provide a system in which code is dynamically changing based on AI as it learns to write code for that system. This can be used both in test/training scenarios or live in a production environment. When a problem is encountered, new code is generated and executed to bypass the problem. If the new code paths encounter a problem as well, the system can identify that the problem is different. If another problem is found further along in a newly generated code path, the same techniques can be applied to use reinforcement learning to generate new lines of code for this problem. This can be applied to the entire code path until one that fully succeeds is generated. Thus, the system is configured to self-heal and continue operation for all future requests and invocations of the code path.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

identifying, during execution of an application including a portion of multipathing code comprising a first path and a second path, a first fault in an execution of the first path, wherein the first fault includes one or more execution errors resulting from the execution of the first path;

generating, based on the first fault, a first prompt for an artificial intelligence (AI) language model, wherein generating the first prompt for the AI language model includes:

generating the first prompt based on whether the first fault resulted from AI-generated code or human-generated code, wherein, when the first fault resulted from human-generated code, the first prompt is generated to include a request to generate new code based on the human-generated code; and applying a first modification to the first path based on an output of the AI language model in response to the first prompt.

2. The method of claim 1, wherein the second path is executed in response to identifying the first fault in the first path; and wherein generating the first prompt is further based on determining that the second path executed successfully.

3. The method of claim 1, wherein the first prompt identifies a failure point in the first path.

4. The method of claim 1, wherein the first path is a default code path and the second path is a secondary code path.

5. The method of claim 1, wherein first source code corresponding to the first path is based on a first programming language and second source code corresponding to the second path is based on a second programming language.

6. The method of claim 1, wherein the first path and the second path are directed to identical outcomes.

7. The method of claim 1, wherein, when the first fault resulted from AI-generated code, the first prompt is generated to include a request to regenerate the AI-generated code based on failure state information associated with the AI-generated code.

8. The method of claim 1 further comprising:

identifying a second fault during execution of the first path after application of the first modification, wherein the second fault resulted from a same portion of code as the first fault;

generating a second prompt for the AI language model based on failure information of the first fault and the second fault; and applying a second modification to the first path based on the output of the AI language model in response to the second prompt.

9. The method of claim 1 further comprising:

identifying a second fault during execution of the first path after application of the first modification;

adjusting one or more parameters of the AI language model; and generating a second prompt for the AI language model.

10. The method of claim 1 further comprising:

in response to determining that execution of the first path after application of the first modification progressed beyond a point of the first fault, associating the first prompt with a resolution of the first fault.

11. An apparatus comprising:

a processing device; and memory operatively coupled to the processing device, wherein the memory stores computer program instructions that, when executed, cause the processing device to:

identify, during execution of an application including a portion of multipathing code comprising a first path and a second path, a first fault in an execution of the first path, wherein the first fault is identified during the execution of the first path, and wherein the first fault includes one or more execution errors resulting from the execution of the first path;

generate, based on the first fault, a first prompt for an artificial intelligence (AI) language model, wherein the computer program instructions that cause the processing device to generate the first prompt for the AI language model further cause the processing device to:

generate the first prompt based on whether the first fault resulted from AI-generated code or human-generated code, wherein, when the first fault resulted from human-generated code, the first prompt is generated to include a request to generate new code based on the human-generated code; and apply a first modification to the first path based on an output of the AI language model in response to the first prompt.

12. The apparatus of claim 11, wherein the second path is executed in response to identifying the first fault in the first path; and wherein the first prompt is generated further based on determining that the second path executed successfully.

13. The apparatus of claim 11, wherein, when the first fault resulted from AI-generated code, the first prompt is generated to include a request to regenerate the AI-generated code based on failure state information associated with the AI-generated code.

14. The apparatus of claim 11 further comprising instructions that, when executed, cause the processing device to:

identify a second fault during execution of the first path after application of the first modification, wherein the second fault resulted from a same portion of code as the first fault;

generate a second prompt for the AI language model based on failure information of the first fault and the second fault; and apply a second modification to the first path based on the output of the AI language model in response to the second prompt.

15. The apparatus of claim 11 further comprising instructions that, when executed, cause the processing device to:

identify a second fault during execution of the first path after application of the first modification;

adjust one or more parameters of the AI language model; and generate a second prompt for the AI language model.

16. A computer program product comprising a computer readable storage medium, wherein the computer readable storage medium comprises a computer program that, when executed:

identifies, during execution of an application including a portion of multipathing code comprising a first path and a second path, a first fault in an execution of the first path;

generates, based on the first fault, a first prompt for an artificial intelligence (AI) language model, wherein the computer program that, when executed to generate the first prompt for the AI language model, further:

generates the first prompt based on whether the first fault resulted from AI-generated code or human-generated code, wherein, when the first fault resulted from human-generated code, the first prompt is generated to include a request to generate new code based on the human-generated code; and applies a first modification to the first path based on an output of the AI language model in response to the first prompt.

* * * * *